June 4, 1968   R. V. MATHISON   3,386,122
ROTATABLE DISC DEVICES
Filed Dec. 13, 1965
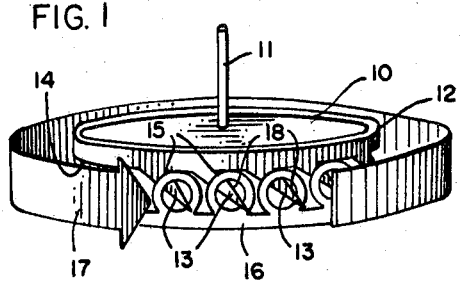
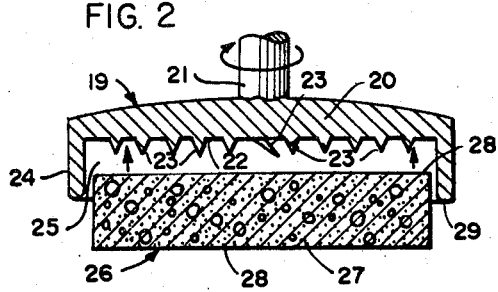
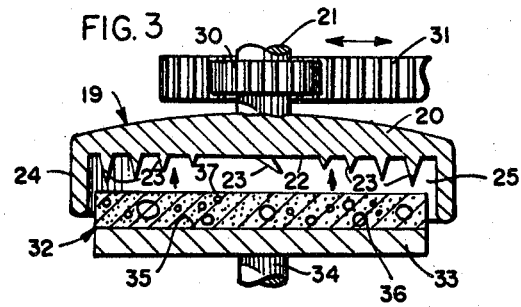
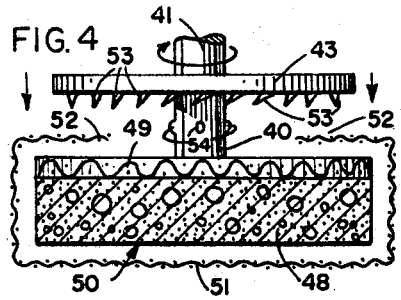
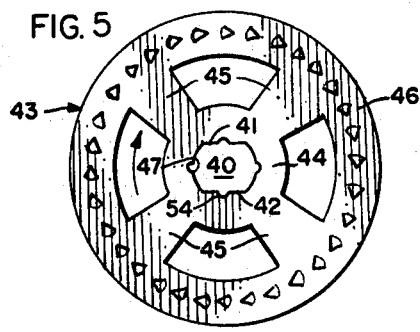
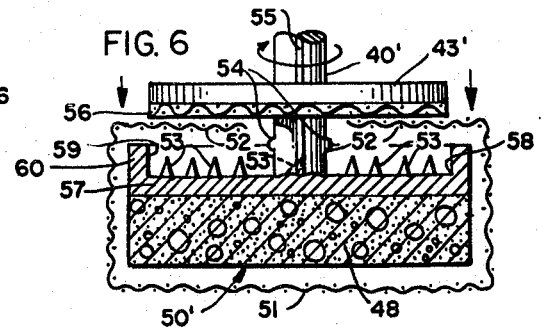
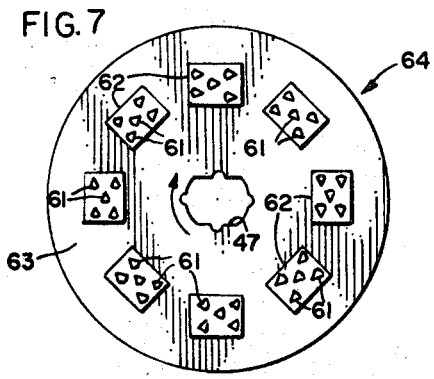
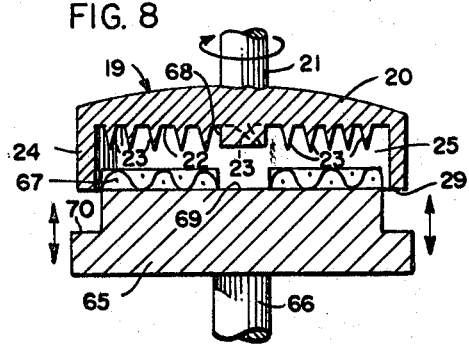
INVENTOR:
ROBERT V. MATHISON
BY
Marzall, Johnston, Cook & Root
ATT'YS

3,386,122
ROTATABLE DISC DEVICES
Robert V. Mathison, 5 Woodcrest Road,
Asheville, N.C. 28804
Continuation-in-part of application Ser. No. 285,261,
June 4, 1963. This application Dec. 13, 1965, Ser.
No. 513,400
7 Claims. (Cl. 15—230.17)

ABSTRACT OF THE DISCLOSURE

Rotatable devices with disc-face containing sloping projections adapted to penetrate and remain seated in porous member and releasably grip same; uses thereof in holders for rotary cleaning devices, clutches and one-way drives.

---

This application is a continuation-in-part of my copending application Ser. No. 285,261, filed June 4, 1963, now U.S. Patent No. 3,261,069, issued July 19, 1966.

This invention, in general, relates to rotatable members having a disc face with a plurality of small, tapered, outwardly sloping projections having relatively sharp tips, the axes of the respective projections extending substantially at right angles to respective radii through said projections from the center of the disc face and sloping at an acute angle, relative to the face, of about 15–60°. These projections are adapted to penetrate the pores or interstices in the surface of a porous member and remain tightly seated therein when the rotatable member is rotated with the projections orbiting in a direction whereby the undersides of said sloping projections are the leading sides.

The aforesaid rotatable members have many mechanical applications. Among them may be listed: a component of a clasp or gripping device for a flexible, porous sheet or cover mounted around a rotatable support, e.g., a buffing or polishing disc with a fabric cover; a component of a clutch or rotary drive coupling, e.g., as a driven or driving face of a clutch or drive coupling, in which the projections penetrate the interstices of a porous surface on the other face of the clutch or drive coupling and rotatably interlock the two faces when the projections orbit as aforesaid; and a component of a rotatable holder for a porous or porous backed member removably seated in a cavity in which the projection containing face is the bottom wall.

The embodiments with a cavity have shoulder means projecting from the disc face beyond the tips of the projections, the shoulder means and the face defining the cavity. A porous member or porous backed member may be seated in the cavity in frictional engagement with the shoulder means so that it does not fall out of the cavity when the latter faces downwardly or said member may be loose in the cavity.

The embodiments used for gripping a flexible, porous sheet may include the projection-containing member coupled to the drive shaft by means non-rotatably but axially slidably mounting it near an end of the shaft. The end of the shaft has a support member coupled thereto. The device has means for releasably holding the projection-containing face of the rotatable member contiguous to the support member whereby the support member and the projection-containing member are together adapted to hold a fabric against said face with said projections penetrating said fabric when said fabric is inserted therebetween. Alternatively, the embodiments of this type may have the projection-containing, rotatable member rigidly held on the end of the drive shaft with the projection-containing face facing away from said end of the shaft. A plate is non-rotatably but axially slidably mounted on the shaft. The device has means releasably holding the plate contiguous to the face whereby the plate and the projections are together adapted to hold a fabric against said face with said projections penetrating said fabric when said fabric is inserted therebetween. The flexible, porous sheet may be a fabric sheet wrapped about the support member with the edge portion of the sheet held or pressed against the projection-containing face, whereby the projections penetrate and hold the fabric sheet on the support member.

The embodiments of the projection-containing, rotatable member in clutches or rotary drive couplings use the member as the driven or driving disc face of the clutch or drive coupling. It coacts with another, opposing disc face on a second rotatable member. The latter is mounted for rotation about an axis of rotation substantially at the center of the opposing disc face and substantially aligned with the axis of rotation of the first-mentioned rotatable member. The opposing disc face has a surface of porous material, and the faces are held in face-to-face contact with the projections penetrating and seated in the interstices of the porous material.

The rotatable members and the respective faces may be held in the face-to-face contact by means for effecting relative movement of said members and faces toward and away from each other to engage and disengage the projections from the interstices of the porous material, thereby providing a clutch combination having a disengageable, unidirectional, rotary drive. Alternatively, the rotary drive coupling may be one wherein said means holding said faces in face-to-face contact maintains said contact at a contact pressure of said layer against said projections whereby the latter penetrate said interstices and grip said porous material when the driven member of said coupling is rotated in one direction and whereby said projections release from said interstices and slide over said porous material when said driven member is rotated in the opposite direction. This type of coupling may be used in a step-by-step, unidirectional, rotary drive mechanism by providing means operatively associated with the driven member of the coupling for oscillating said member.

It is a primary object of the invention to provide projection-containing, rotatable members having the structural and functional features aforedescribed. Another object is to provide combinations embodying said projection-containing rotatable members in clasp or gripping devices, in clutches or rotary drive couplings, in rotatable holders for a porous or porous backed member seated in a cavity, and in other mechanical applications.

The aforesaid projections may be tapered pins of metal or like material mounted in or on the disc face, or they may be cast or molded integrally therewith or struck out therefrom. Preferably, however, the projections are made of synthetic thermoplastic polymer and are molded or cast integrally with a plastic disc face or with small, plastic plates, which in turn are mounted on the disc face. The projections may be arranged on the face in a variety of ways, e.g., in radial rows, in one or more circles, or on plates arranged in radial rows or one or more circles.

The foregoing and numerous other important objects, features and inherent functions of the invention will be apparent as the same is more fully understood from the following description, which, taken in connection with the accompanying drawings, discloses preferred embodiments of the invention.

In the drawings:

FIG. 1 is a schematic, perspective view of a disc fastener member having the aforesaid tapered, sloping projections on a disc face in rotary drive gripping relationship with fabric having a loop pile surface;

FIG. 2 is an exploded view of a diametric cross-section of a rotatable clasp or holder and a porous member received in the cavity thereof;

FIG. 3 is an exploded view in diametric cross-section of a rotary drive coupling with an oscillating drive for the driven member;

FIGS. 4 and 5 are, respectively, (a) an exploded view in side elevation of a rotatable device for holding a fabric sheet about a rotatable support on the end of a drive shaft and (b) a bottom plan view of the projection-containing disc thereof;

FIG. 6 is an exploded, side elevation of another embodiment of a rotatable device for holding a fabric sheet about a rotatable support on the end of a drive shaft;

FIG. 7 is a plan view of a disc embodiment with projection-containing plates mounted on a disc face; and FIG. 8 is an exploded view in diametric cross-section of a disengageable clutch of the invention.

Referring to the drawings, the embodiment of FIG. 1 is a rotatable gripping device comprising a disc 10 mounted on rotatable shaft 11. The disc 10 has a ring 12 tightly mounted about its circumference. The ring 12 has downwardly projecting, sloping, small, tapered projections 13 having relatively sharp tips. The axes of projections 13 and the shortest sides thereof extend substantially at right angles to the respective radii through said projections from the center of disc 10. The axes slope at an acute angle of about 15–60° relative to the lower face 14 of disc 10. The undersides of the projections also slope relative to said face at an acute angle of about 20–70°. Projections 13 are thin wall wedges which penetrate the interstices (loops 15) of a loop pile fabric piece 16. When projections 13 orbit in the direction of arrow 17 as the disc 10 rotates correspondingly, the loops work downwardly along shortest sides 18 and are held on the projections under conditions wherein there is a drag, which may be very light, on rotation of piece 16.

The embodiment of FIG. 2 comprises a rotatable member 19 having disc 20 attached to and rotatably driven by drive shaft 21. The disc face 22, as illustrated, is planar, but it may be concave or convex, if desired. The small, tapered, sloping projections 23 are arranged in radial rows. The slope of the projections 23 relative to face 22 can be seen from the centermost projection, which is seen in side elevation. The other projections, when viewed in side elevation, look the same.

An annular rib or shoulder 24 projects forwardly of face 22 a distance well beyond the tips of projections 24 and defines with face 22 a cavity 25. The wall defining shoulder 24 may be a cylindrical wall as shown, or it may be a series of spaced, short wall segments, pins, rods, etc., arranged in the desired shape, e.g., a circle.

The cavity 25 receives a member 26 to be rotated by the rotatable member 19. As illustrated, the rotatable member 19 is a cellular elastomer cylinder 27, the upper surface 28 of which has pores, by virtue of the cellular structure of the cellular elastomer. When the pores are penetrated by the sloping projections 23, the shortest sides thereof (the undersides) press against the sides of the pores when the member 19 and shaft 21 are rotated in the arrow direction, thus rotatably driving the cellular elastomer cylinder 27 with the member 19.

The cellular elastomer cylinder 27 may be a cleaning device, e.g., a sponge-like scrubbing member. The working surface 28 extends beyond the lower edge 29 of shoulder 24. The cylinder 27 may have a diameter less than the diameter of cavity 25 so that it will fall out of the cavity easily. An example where such relationship may be advantageous is a cleaning device wherein the cylinder 27 is used for both cleaning by hand and for rotary power-driven cleaning on the same cleaning job. A brush structure may be adapted for the same uses.

When the work surface 28 is pressed against another surface so as to resist rotation of the cylinder 27, the projections 23 are tightly seated in the pores of surface 28. However, if the rotation is stopped or the aforesaid resistance to rotation is removed, the cylinder 27 easily releases from projections 23. Still further, if cylinder 27 is turned relative to face 22 in the direction of slope of projections 23, the projections release immediately.

If desired, the diameter of cylinder 27 may be the same as or slightly more than the diameter of cavity 25 so that there is a light friction which keeps the cylinder from falling out of the cavity 25.

The embodiment of FIG. 3 shows the use of the rotatable member 19 as a component of a step-by-step, intermittent, unidirectional rotary drive. Where applicable, like numerals designate like parts. The rotatable member 19 is oscillated by a suitable mechanical drive, e.g., a pinion 30 on shaft 21 and a reciprocating rack 31 driving the pinion. The driven element 32 comprises a disc or plate 33 rotatably supported by shaft 34 for rotation about an axis coaxial with the axis of rotation of the drive member 19. The face 35 of disc or plate 33, which faces the projection-containing face 22, has affixed thereon a layer 36 of porous material having interstices adapted to be penetrated by and gripped upon projections 23. The layer 36 may be fabric which is woven, knitted or a loop pile. Preferably it is the latter or a cellular elastomer for reasons hereinafter set forth.

The face 37 of layer 36 is brought into light contact with face 22 and projections 23, the latter in this illustrated case having progressively longer lengths in each radial row from the center outwardly. Uniform length projections may be used, if desired.

Under the aforesaid light contact, the projections 23 bite into the interstices of porous surface 37 when they are orbited with their undersides in the lead. This interlocks the driving member 19 with the driven member 32 so that the latter and its shaft turn. When projections 23 are orbited in the opposite direction, projections 23 release from the interstices and slide over the surface 37 by virtue of the light contact of surface 37 with the projections 23. The surface 37 preferably is one which will deform resiliently so that projections 37 do not wear the surface unduly as they slide thereover. Loop pile of the type used in carpeting or cellular elastomers are particularly suitable.

The mechanism of FIG. 3, therefore, provides a step-by-step, unidirectional, rotary drive of the member 32. As viewed in FIG. 3, the rotary drive of member 32 is activated when rack 31 moves to the right and is deactivated when rack 31 moves to the left.

The embodiment of FIGS. 4 and 5 comprises a rotatable drive shaft 40 having flat sides 41 and 42 on opposite sides. A spider disc 43 has a hub 44 connected by spider arms 45 to an outer ring 46. The hub 44 has a central hole 47 matingly shaped to shaft 40 whereby the spider disc 43 is non-rotatably but axially slidably mounted on the shaft.

A support member 50, e.g., a disc 48 of cellular elastomer with a fabric backing ring 49, is rigidly held on the end of shaft 40. A fabric sheet 51 is wrapped about support member 50 to provide a rotary buffer or polisher. The sheet 51 is held by pushing spider disc 43 against backing ring 49 with the edge portion 52 of fabric 51 therebetween. The small, tapered, sloping projections 53 penetrate the edge portion 52 and the fabric backing 49 and grip the fabric sheet 51. The projections 53 are arranged in a circle and all slope in the same circumferential direction. Their respective axes are substantially at right angles, as viewed in FIG. 5, to the respective radii therethrough from the center of disc 43. The latter is held in gripping position by small protuberances 54 on shaft 41, over which protuberances the hub 44 slides with elastic deformation of the sides of hole 47 and/or the protuberances.

The embodiment of FIG. 6 is similar in many respects to that of FIGS. 4 and 5. Where applicable, like numerals designate like parts. The disc 43' is coupled non-rotatably but axially slidably to shaft 40' by a spline 55 and key (not shown). Its lower surface carries the fabric backing 56. Sloping, small, tapered projections 53 are arranged in radial rows on the upper face 58 of a rigid support disc 57, which is fixedly held on shaft 40' and to the lower surface of which is bonded the cellular elastomer disc 48. Disc 57 has a ring-shaped shoulder 60 defining with face 58 a cavity 59 in which disc 43' is received. The edge portions 52 fold over the shoulder 60 when disc 43' is pressed into the cavity.

The embodiment of FIG. 7 is a disc which can be used in any embodiment of the invention. In the other illustrated embodiments, the projections are molded integral with or mounted individually on the projection-containing member. In FIG. 7, the projections 61 are formed in groups on respective plates or bases 62. The plates or bases with the small, tapered, sloping projections thereon preferably are integrally molded from synthetic thermoplastic polymers and may be made in accordance with the disclosure of my U.S. Patent No. 3,214,816, issued Nov. 2, 1965, the disclosure of which is incorporated herein by reference. The projections 61 on each plate 62 all slope in substantially the same direction, and the plates 62 are mounted in any suitable manner, e.g., by adhesive, in one or more circles on the face 63 of disc 64 so that the projections all slope in substantially the same circular or circumferential direction. When used in the embodiments of FIGS. 4 or 6, the disc may have a central hole 47 of the same shape as hole 47 of FIG. 5.

The embodiment of FIG. 8 is a disengageable clutch employing as the driving (or driven) member the previously described rotatable member 19. The other component of the clutch comprises a rigid disc 65 rotatably mounted by shaft 66 for rotation about an axis substantially coaxial with the axis of rotation of shaft 21. The clutch face has a fabric facing ring 67 which is brought into engagement with projections 23. The latter penetrate the interstices of the fabric facing 67 and thereby interlock members 19 and 65 for rotation together in the arrow direction. The clutch members are moved toward and away from each other in the arrow directions by any conventional mechanism (not shown). The depth to which disc 65 and its facing ring 67 enter cavity 25 may be limited by providing a stub shaft 68 at the center of face 22, which stub shaft contacts the center portion 69 of disc 65, and/or by providing on disc 65 an annular shoulder 70 which contacts the edge 29 of the shoulder 24. The clutch combination provides a positive, non-slip interlock of the rotatable clutch elements 19 and 65 when the sloping projections 23 are orbiting with their shortest sides (the undersides) as the lead sides.

In the preferred forms, the aforesaid projections are smooth-sided, substantially rigid, closely spaced projections which taper from their bases to relatively sharp tips. They preferably are substantially conical or pyrimidal, slightly blunted if desired, and have a center-to-center spacing at their tips in the order of 0.03 to 0.25 per inch. The size of the bases of the projections is preferably at least 0.03 inch in one direction. The vertical heights of the tips from the surface from which they emanate preferably is in the range of 0.03 to 0.15 inch. The intensity of the projections, when arranged in close rows as on plates or bases 63, is preferably in the range of 100 to 500 projections per square inch of the surface actually covered by the projections.

Small, closely-spaced projections in relatively large numbers are particularly advantageous for the uses herein. They easily penetrate, seat in, exit from, and slide over, as the case may be, the woven, knitted, loop pile, and like fabrics or other porous members such as cellular elastomers with minimum damage to the fabric or other porous members.

The size and arrangement of the projections will vary to some extent depending upon the intended use but in most cases it is preferable that the projections be integrally formed or molded on a supporting sheet at an axis angle of 45 to 60°, that the adjacent projections be separated from each other center-to-center by a distance of from 0.060 to 0.150 inch, and that the vertical height from the tips of the projections to the surface of the supporting member be from 0.060 to 0.150 inch.

The synthetic polymer from which the projection containing member is formed can be a homo-polymer, such as a polymer of formaldehyde (e.g., Delrin), or a polymer of tetrafluoroethylene (e.g., Teflon), or polyethylene or polypropylene, or a copolymer (e.g., nylon). These polymers can also be described as synthetic resins.

All the rotatable member embodiments with the disc face and the projections thereon may be characterized broadly as a plurality of small, tapered, sloping projections having relatively sharp tips and projecting from said face of said disc, the axes of the respective projections extending substantially at right angles to respective radii through said projections from said center and sloping at an acute angle relative to said face of about 15–60°, the undersides of said sloping projections also sloping at an acute angle relative to said face of about 20–70°, and said projections adapted to penetrate the interstices of a porous member and remain tightly seated therein when said rotatable member is rotated with said projections orbiting with the undersides of said sloping projections being the leading sides.

It is thought that the invention and its numerous attendant advantages will be fully understood from the foregoing description, and it is obvious that numerous changes may be made in the form, construction and arrangement of the several parts without departing from the spirit or scope of the invention, or sacrificing any of its attendant advantages, the forms herein disclosed being preferred embodiments for the purpose of illustrating the invention.

The invention is hereby claimed as follows:

1. A rotatable device comprising a rotatable member having a disc face, a shaft connected to said member for rotation of said member about an axis of rotation substantially at the center of said disc face, a plurality of small, tapered, sloping projections having relatively sharp tips and projecting from said face of said disc, the axes of the respective projections extending substantially at right angles to respective radii through said projections from said center and sloping at an acute angle relative to said face of about 15–60°, the undersides of said sloping projections also sloping at an acute angle relative to said face of about 20–70°, said projections adapted to penetrate the interstices of a fabric member and remain tightly seated therein when said rotatable member is rotated with said projections orbiting and the undersides of said sloping projections being the leading sides, means non-rotatably but axially slidably mounting said rotatable member on said shaft near an end thereof, a support member attached to said end of said shaft for rotation therewith, and means releasably holding said face of said rotatable member contiguous to said support member and together adapted to hold a fabric against said face with said projections penetrating said fabric when said fabric is inserted therebetween.

2. A rotatable device as claimed in claim 1, and a fabric sheet wrapped about said support member, the edge portion of said sheet being located between said support member and said rotatable member with said projections penetrating said edge portion and holding said fabric sheet on said support member.

3. A rotatable device comprising a rotatable member having a disc face, a shaft connected to said member for rotation of said member about an axis of rotation substantially at the center of said disc face, a plurality of small, tapered, sloping projections having relatively sharp tips and projecting from said face of said disc, the axes of the respective projections extending substantially at right angles to respective radii through said projections from said center and sloping at an acute angle relative to said face of about 15–60°, the undersides of said sloping projections also sloping at an acute angle relative to said face of about 20–70°, said projections adapted to penetrate the interstices of a fabric member and remain tightly seated therein when said rotatable member is rotated with said projections orbiting and the undersides of said sloping projections being the leading sides, means rigidly holding said rotatable member on an end of said shaft, said disc face facing away from said end of said shaft, a plate mounted on said shaft near said end, means non-rotatably but axially slidably mounting said plate on said shaft, and means releasably holding said plate contiguous to said face and the projections thereon and together adapted to hold a fabric against said face with said projections penetrating said fabric when said fabric is inserted therebetween.

4. A rotatable device as claimed in claim 3, and a fabric sheet wrapped about said rotatable member, the edge portion of said sheet being located between said rotatable member and said plate with said projections penetrating said edge portion and holding said fabric sheet on said rotatable member.

5. A rotatable device as claimed in claim 1, and small, thermoplastic polymer plates mounted on said disc face in the form of a circle, said projections being thermoplastic polymer projections integrally molded with said plates, and the projections of each respective plate sloping in the same general direction.

6. A rotatable device as claimed in claim 3, and small, thermoplastic polymer plates mounted on said disc face in the form of a circle, said projections being thermoplastic polymer projections integrally molded with said plates, and the projections of each respective plate sloping in the same general direction.

7. A rotatable device embodying a rotatable holder for a buffing cloth and the like, said holder having a disc face, small, thermoplastic polymer plates mounted on said disc in the form of a circle, thermoplastic polymer projections integrally molded on a face of each plate, the projections on each plate having relatively sharp tips and projecting from said face of said disc, the axes of the respective projections extending substantially at right angles to respective radii through said projections from the center of said disc, and sloping at an acute angle relative to said face of about 15–60°, the undersides of said sloping projections also sloping at an acute angle relative to said face of about 20–70°, said projections adapted to penetrate the interstices of a fabric member and remain tightly seated therein when said rotatable member is rotated with said projections orbiting and the undersides of said sloping projections being the leading sides, and the projections on each plate sloping in the same general direction.

References Cited

UNITED STATES PATENTS

| 1,143,725 | 6/1915 | Reed | 51—378 |
| 1,984,990 | 12/1934 | Reineman | 15—230.17 |
| 2,008,260 | 7/1935 | Reineman | 15—230.17 X |
| 2,119,738 | 6/1938 | Dempsey | 51—379 |
| 2,156,179 | 4/1939 | Hill | 15—230.17 |
| 3,067,549 | 12/1962 | Laverdisse | 15—230.17 |
| 3,090,064 | 5/1963 | Garrett | 15—209.51 |
| 3,143,895 | 8/1964 | Robie. | |
| 3,214,816 | 11/1965 | Mathison. | |
| 3,302,232 | 2/1967 | Wasiloff et al. | 15—230.17 |

FOREIGN PATENTS

| 80,153 | 2/1963 | France. |
| 163,824 | 11/1933 | Switzerland. |

DANIEL BLUM, *Primary Examiner.*